United States Patent
Kindbeitter et al.

(10) Patent No.: US 12,487,012 B2
(45) Date of Patent: Dec. 2, 2025

(54) REAGENT FOR A THERMAL MACHINE

(71) Applicant: Sofrigam SA, Rueil-Malmaison (FR)

(72) Inventors: Francis Kindbeitter, Rueil-Malmaison (FR); Xavier Lulka, Rueil-Malmaison (FR); Clement Serret, Rueil-Malmaison (FR); David Tadiotto, Rueil-Malmaison (FR); Gilles Labranque, Rueil-Malmaison (FR)

(73) Assignee: Sofrigam SA, Cedex (FR)

( * ) Notice: Subject to any disclaimer, the term of this patent is extended or adjusted under 35 U.S.C. 154(b) by 319 days.

(21) Appl. No.: 18/033,495

(22) PCT Filed: Oct. 19, 2021

(86) PCT No.: PCT/EP2021/078943
§ 371 (c)(1),
(2) Date: Apr. 24, 2023

(87) PCT Pub. No.: WO2022/084311
PCT Pub. Date: Apr. 28, 2022

(65) Prior Publication Data
US 2023/0417457 A1    Dec. 28, 2023

(30) Foreign Application Priority Data
Oct. 22, 2020    (FR) ................... 2010843

(51) Int. Cl.
*F25B 17/08*    (2006.01)
*B01J 20/02*    (2006.01)
(Continued)

(52) U.S. Cl.
CPC .......... *F25B 17/08* (2013.01); *B01J 20/0222* (2013.01); *B01J 20/0288* (2013.01); *B01J 20/20* (2013.01);
(Continued)

(58) Field of Classification Search
CPC ...... F25B 17/08; B01J 20/022; B01J 20/0288; B01J 20/20; B01J 20/28011;
(Continued)

(56) References Cited

U.S. PATENT DOCUMENTS

2015/0027661 A1*  1/2015  Rigaud ............... F25B 29/006
                                                        165/58

FOREIGN PATENT DOCUMENTS

FR    2 979 001 A1    2/2013
FR    3 007 114 A1    12/2014
(Continued)

OTHER PUBLICATIONS

International Search Report mailed Dec. 7, 2021 in International Application No. PCT/EP2021/078943.

*Primary Examiner* — Elizabeth J Martin
(74) *Attorney, Agent, or Firm* — Thomas | Horstemeyer, LLP

(57) ABSTRACT

The disclosed subject matter relates to a reactive matrix for the sorption/desorption of a heat transfer fluid (FG) in a reactor of a cold production device, this matrix comprising a compacted mixture of sorbent, of the manganese chloride monohydrate type, and expanded natural graphite in a preferred proportion of 79/21. The disclosed subject matter also relates to a method for manufacturing a wafer from this matrix and a reactor comprising a stack of such wafers.

11 Claims, 2 Drawing Sheets

(51) Int. Cl.
*B01J 20/20* (2006.01)
*B01J 20/28* (2006.01)
*B01J 20/30* (2006.01)

(52) U.S. Cl.
CPC ... *B01J 20/28011* (2013.01); *B01J 20/28019* (2013.01); *B01J 20/28042* (2013.01); *B01J 20/3035* (2013.01); *B01J 20/3078* (2013.01)

(58) Field of Classification Search
CPC .............. B01J 20/2019; B01J 20/28042; B01J 20/3035; B01J 20/3078
See application file for complete search history.

(56) References Cited

FOREIGN PATENT DOCUMENTS

| WO | WO 2014/013145 A1 | 1/2014 |
|---|---|---|
| WO | WO 2016/065048 A1 | 4/2016 |

* cited by examiner

[Fig. 1]
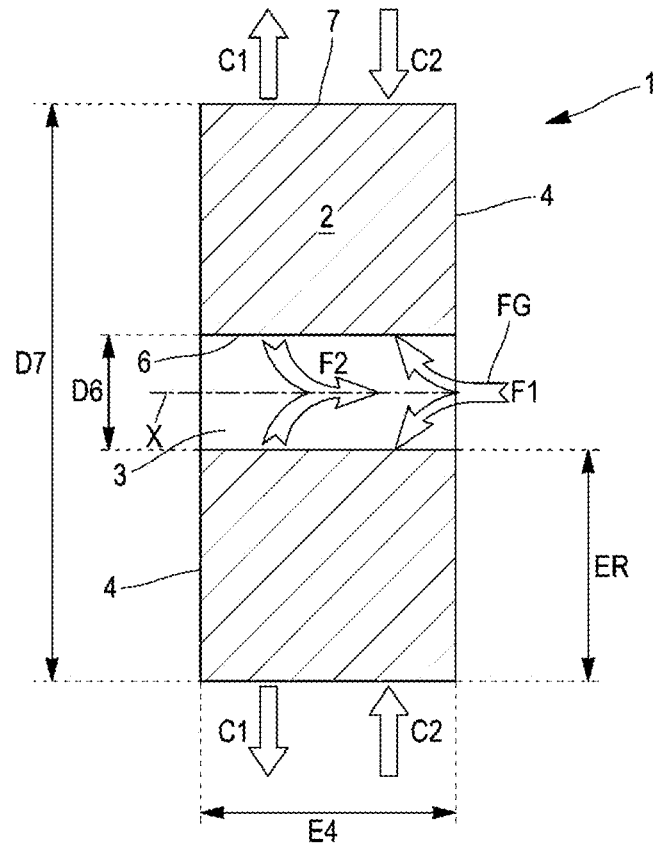
[Fig. 2]
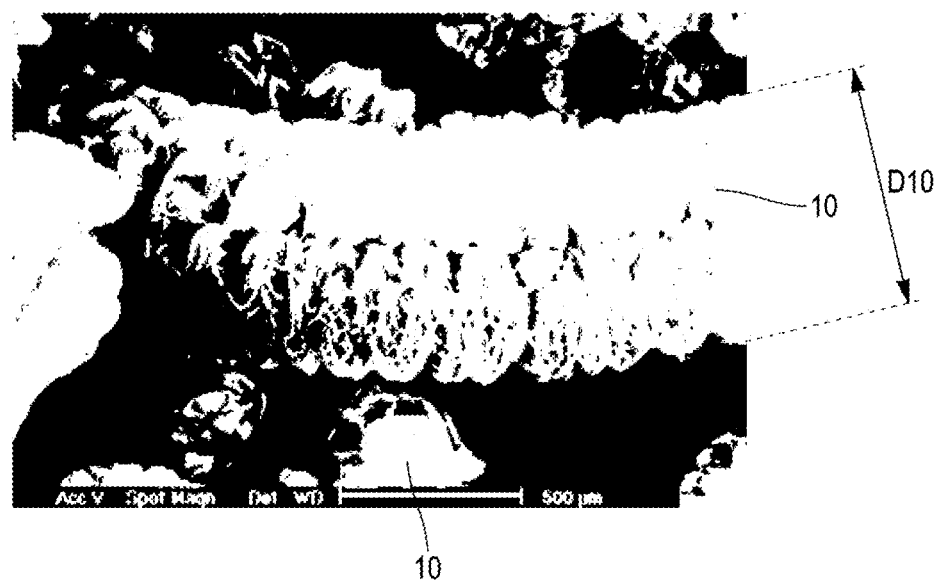

[Fig. 3]
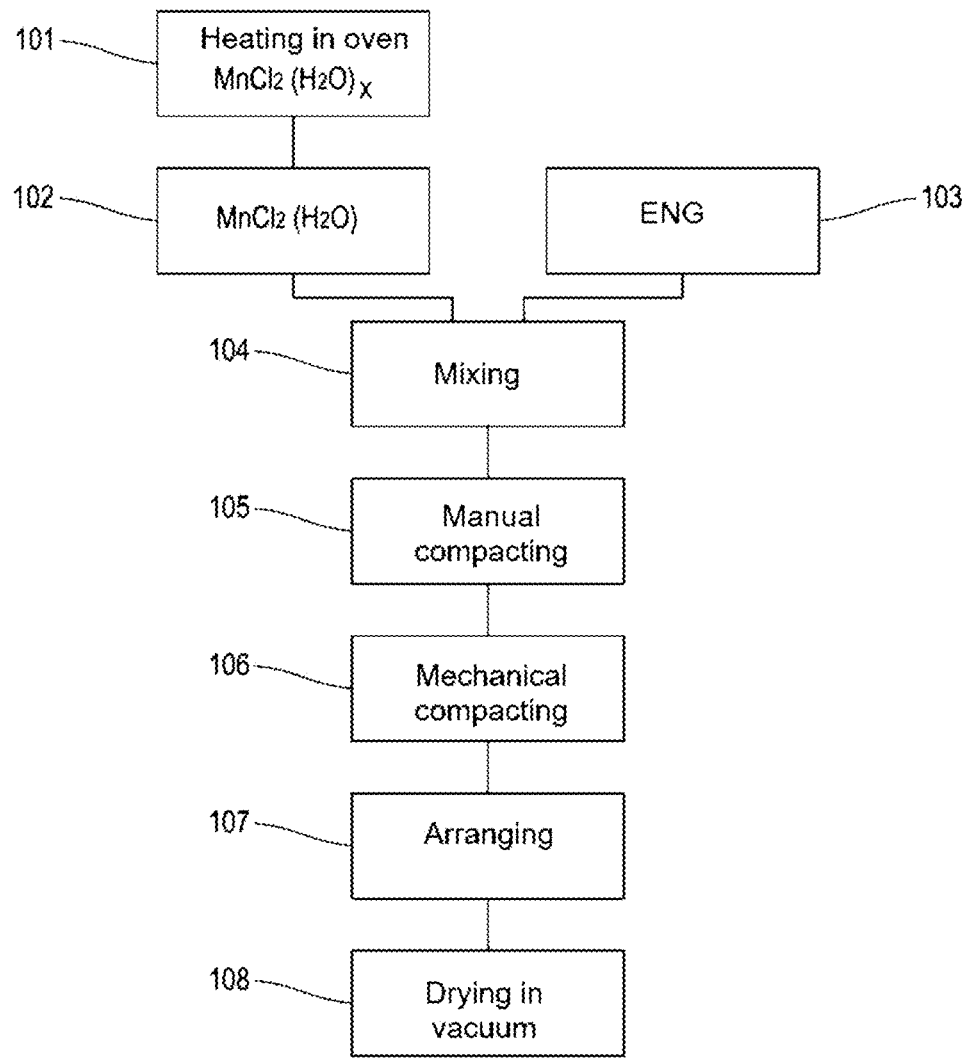

REAGENT FOR A THERMAL MACHINE

CROSS-REFERENCE TO RELATED APPLICATION

This Non provisional application claims priority to PCT Application No. PCT/EP2021/078943, which was filed on Oct. 19, 2021, the entire contents of which are incorporated by reference herein.

This invention relates to the design and manufacture of a reagent matrix used for the sorption of a cooling gas produced by the evaporation of a heat transfer fluid, or cooling fluid, in this case. Evaporation takes place in an evaporator of a machine for producing cold.

Such a machine for producing cold comprises an evaporator and a reactor that are arranged in a closed circuit. It uses a cooling fluid (the coolant) which is evaporated in the evaporator and whose vapours are absorbed by a sorbent material (the sorbent), in the reactor.

A cold production phase corresponds to the endothermic evaporation of the coolant in the evaporator at low pressure and to the chemical sorption of the vapours produced by the exothermic synthesis reaction occurring in the reactor. The heat of reaction produced must be evacuated to keep the reaction out of equilibrium and thus allow the production of cold to continue. The equilibrium gap is directly related to the rate of transformation and therefore to the thermal power involved. Reaching the equilibrium conditions stops the reaction and therefore the sorption of the cooling gas by the salt.

This phase ends when there is no more cooling fluid to be evaporated. A regeneration phase corresponds to regeneration of the system at high pressure. By supplying heat to the reactor, at a temperature greater than its equilibrium temperature, the vapour is desorbed by the reagent and condenses in the condenser; the latent heat of condensation is evacuated in the surrounding environment.

The thermochemical methods can use various solid/gas working pairs: reactive salts such as oxides, hydrates, hydrides, ammoniacates. A summary of the state of the art on the families of existing reactive pairs is provided in particular in documents "A review on adsorption working pairs for refrigeration," [L. W. Wang, R. Z. Wang, and R. G. Oliveira, Renew. Sustain. Energy Rev., vol. 13, no. 3, pp. 518-534, April 2009] and "Adsorption Refrigeration Working Pairs: The State-of-the-Art in the Application," [A. N. Shmroukh, A. H. H. Ali, and A. K. Abel-rahman, Int. J. Chem. Nucl. Metall. Mater. Eng., vol. 7, no. 11, pp. 453-465, 2013].

The choice of the reactive pair, in other words the pair formed by the coolant and the sorbent, the implementation of the sorbent in the reactor, the operating conditions imposed and the design of the complete system, have a direct impact on the system performance. In addition, depending on the refrigeration application targeted with this type of method, the aim is to favour an implementation of the reactive material which will produce either a high energy density, for a storage application with cold production at low power, or a high specific refrigeration capacity, for a storage application with high instantaneous power.

The implementation must be optimised. A high energy density promotes a storage application at the expense of a power application.

One objective of the invention is to propose a reactive pair and an implementation of the reagent that optimises both the power and the storage capacity of a system using such a pair.

According to the invention, a reactive matrix for the sorption/desorption of a heat transfer fluid, preferably ammonia, in a reactor of a cold production device, comprises a mixture of sorbent and expanded graphite, preferably an expanded natural graphite (ENG). Preferably, the sorbent is a salt of the manganese chloride type. Advantageously, the matrix comprises a proportion of sorbent of between 76% and 82%, preferably about 79%, of the mass of the sorbent material, with the ENG forming substantially the rest of the complement to 100%. Also advantageously, the matrix is compacted such that the apparent mass of the ENG is between 100 kg/m3 and 130 kg/m3, preferably about 120 kg/m3.

According to another object of the invention, a reactive wafer for the sorption/desorption of a heat transfer fluid, preferably ammonia, in a reactor of a cold production device, consists of a compact matrix according to the invention. Preferably, its shape is cylindrical about an axis and comprises a substantially coaxial interior passage.

Advantageously, such a wafer has an outer diameter of between 100 mm and 110 mm, preferably equal to about 106 mm, and, the duct has a diameter of between 17 mm and 23 mm, preferably equal to about 20 mm, and, the wafer has a substantially constant axial thickness of between 40 mm and 50 mm, preferably equal to about 46.5 mm.

According to another object of the invention, a method for manufacturing a wafer according to the invention, the sorbent being manganese chloride hydrate, comprises a prior drying step, preferably by heating in an oven, to obtain a manganese chloride salt of water content close to 0.1 moles per mole of salt, or less than this value.

Such a method may comprise a step of mixing the manganese chloride monohydrate with the expanded graphite in chosen proportions and a step of compacting said mixture. The compacting step may further comprise an optional manual compacting step and a mechanical compacting step.

According to yet another object of the invention, a method for manufacturing a reactor comprises a step of arranging, in an envelope of the reactor, one or more wafers manufactured according to the invention. Such a method advantageously comprises an additional drying step, by creating a vacuum in the envelope and, preferably, by heating this envelope to a temperature close to 180° C., in order to extract water from the salt monohydrate, preferably until the hydration rate has been reduced to a value close to zero moles of water per mole of manganese chloride.

Embodiments and variants will be described below, given as non-limiting examples, and referring to the attached drawings in which:

FIG. 1 is a diagrammatic axial cross-sectional view of a reactive wafer according to the invention;

FIG. 2 is a photograph of an expanded natural graphite (ENG) vermicule used to form the reactive matrix for the wafer of FIG. 1; and, FIG. 3 is a flowchart showing a method for preparing the wafer of FIG. 1.

FIG. 1 shows an axial cross-sectional view of a wafer 1 according to the invention, formed from a reactive matrix 2 according to the invention. In the example shown, the wafer 1 has a cylindrical shape about an axis X, of outer diameter D7 and axial thickness E4 less than the outer diameter D7. It comprises an axial through-passage 3 that is cylindrical about the axis X. The passage 3 connects two opposite axial flat faces 4. The passage 3 is bounded by a cylindrical inner surface 6, of diameter D6. The wafer 1 is bounded on the outside by a cylindrical outer surface 7, of diameter D7. The wafer has a radial thickness ER equal to (D7−D6)/2.

A reactor consists of several wafers stacked along the axis X, adjusted in an envelope having walls insulating them from the outside environment. This envelope is not shown on the figures.

As shown on FIG. 1, in the embodiment shown, in the cold production phase, the evaporated fluid transits in gaseous form FG inside the passage 3 and is absorbed along F1 by the wafer 1, through the inner wall 6. This gas FG is sorbed by the matrix 2. This sorption produces heat, evacuated along C1 through the outer surface 7 of the wafer, then through the walls of this envelope, towards the outside environment.

During the regeneration phase, heat is supplied to the wafer along C2, through the walls of the envelope and of the outer surface 7. The heat supplied causes desorption of the gas, which is released through the inner wall.

Such a system delivers a refrigeration capacity which is directly related to the quality of the mass and heat transfers within the matrix 2. Thus, to increase the thermal conductivity and limit its agglomeration, the reagent is mixed with a binder to obtain a consolidated composite material that is sufficiently porous, elastic and a very good heat conductor. The porosity is in fact important, since to ensure a good mass yield of the wafer, the gas FG must spread throughout the matrix, over the radial thickness ER. The matrix 2 must therefore be sufficiently elastic in order to withstand the significant temperature and volume changes due to the sorption reactions. In addition, the thermal conductivity must be sufficient, since if the matrix temperature is too high, the sorption will be slowed down or even stopped.

The binder can reduce the permeability of the matrix 2 and limit the gas circulation therein. Similarly, the swelling of the sorbent grains during sorption also progressively reduces the porosity.

It was decided to use a sorbent and a binder in powder form, mixed then compacted to create a solid, anisotropic and porous matrix 2.

In the example shown, the coolant used is ammonia (NH3). The sorbent is a manganese chloride of formula $MnCl_2$. The form used is substantially manganese chloride monohydrate $MnCl_2(H_2O)_x$, where x=1. The binder is an expanded natural graphite (ENG). Manganese chloride is in fact particularly hydrophilic.

Surprisingly, ENG confers certain qualities to the matrix 2:
  elasticity, in order to maintain good contacts between the ENG and the sorbent, as well as between the matrix and the walls of the reactor envelope;
  high thermal conductivity and low thermal mass allowing efficient heat transfers in the matrix; and,
  high permeability of the matrix, such that substantially all the sorbent grains can absorb or desorb gas.

As shown on FIG. 2 in particular, the ENG generally consists of vermicules of diameter D10; the diameter D10 is generally between 0.2 and 0.4 millimetres. A vermicule may be up to 6 millimetres long. Vermicules have the shape of an accordion, a low density and a high specific surface area. The density of raw ENG, as it is supplied, is approximately 6 to 9 kilogrammes per cubic metre. The specific surface area is approximately 40 to 60 square metres per kilogramme.

The sorbent, in this case manganese chloride, consists of solid grains which swell or shrink depending on the step of sorbing or desorbing the ammonia gas FG.

The sorbent grain size (granulometry) has a significant effect on the rate of transformation and the thermal parameters of the wafer. This is due to the interaction between the salt and the ENG which varies depending on the size of the salt grains. The coefficient of thermal exchange by convection increases when the grain size increases; a grain size adapted to the sorption process must therefore be chosen.

Furthermore, the very small salt grains, less than fifty microns (50 µm), manage to penetrate inside the ENG vermicules, the contact surface between the sorbent and the ENG is larger and the consolidated ENG matrix is more subject to the swelling and shrinkage volume variations of the salt grains. Nevertheless, these small grains cause the reagent to separate from the exchange surface and could be entrained by the gas flows, possibly resulting in clogging of the circuit, between the evaporator and the reactor.

It appears that the size of the grains, measured by sieving or micro-sieving, is advantageously between twenty and one hundred and fifty microns (20 µm and 150 µm).

After producing and inserting the matrix in the envelope, a second drying is performed, to lower the hydration rate, preferably down to nearly zero moles of water per mole of manganese chloride.

It appears that a molecule of water in the manganese chloride evaporates above a temperature of between 110 and 150 degrees centigrade. In addition, the salt (manganese chloride) breaks down above 350 degrees centigrade. In addition, to preserve the crystalline structure of the salt, a temperature of 200 degrees centigrade must not be exceeded. The salt is received as the monohydrate; it is dried in an oven at a temperature of 180 degrees centigrade plus or minus 5 degrees centigrade, until it contains only 0.1 moles of water per mole of salt. Sorbent grains not bound together can therefore be obtained.

The second drying is carried out by reducing the air pressure inside the envelope, while heating the envelope to a temperature close to 180 degrees centigrade plus or minus 5 degrees centigrade. Heating is optional; nevertheless, this vacuuming method associated with heating removes the last traces of water contained in the salt. In a preferred version, this second drying comprises the following steps:
  reducing the air pressure inside the envelope, preferably at least down to about 200 micro-bar, and heating the envelope to about 180° C.; then,
  allowing the reactor to cool down; then,
  reducing the air pressure inside the envelope, preferably at least down to about 70 micro-bar.

After performing these drying steps, the circuit is filled and the reagent is saturated with the coolant, ammonia in this case.

The grains of manganese chloride swell as sorption of the coolant proceeds, which could progressively clog the pores of the matrix and therefore rapidly reduce the system efficiency. A matrix comprising a mixture of solvent grains with a binder such as ENG limits clogging considerably and maintains sufficient permeability.

According to the invention, the matrix contains a proportion by weight of about 79% of manganese chloride and 21% of ENG, the mixture being compacted until a density of 571 kg/m3 is obtained. The mixture thus compacted therefore contains about 120 kg of ENG per cubic metre. Under these conditions, it appears that the matrix permeability remains optimum, throughout the sorption/desorption reactions.

The permeability remains sufficient when the proportion of manganese chloride is between 76% and 82% and the apparent density of the ENG, after compacting, is between 100 kg/m3 and 130 kg/m3.

In addition, in a preferred embodiment shown on FIG. 1, the reactive matrix forms a wafer having the following dimensions:

D6 between 17 mm and 23 mm, preferably equal to about 20 mm;

D7 between 100 mm and 110 mm, preferably equal to about 106 mm; and,

E4 between 40 mm and 50 mm, preferably equal to about 46.5 mm.

Another embodiment describes various steps of manufacturing wafers, referring to the flowchart of FIG. 3.

The sorbent salt ($MnCl_2$) monohydrate is heated in an oven (step 101) until a salt having a water content of about 0.1 moles of water per mole of salt is obtained. This salt thus dried (step 102) and the ENG (step 103) are then used and mixed together in the chosen proportions (step 104).

After obtaining the correct mixture, manual compacting is carried out to form a wafer blank (step 105), then mechanical compacting is carried out (step 106), to obtain the wafer in its final dimensions. Preferably, in the example of FIG. 2, the blank has substantially the radial dimensions D6, D7 of the final wafer and compacting is carried out axially, in other words in the direction of the axis X, to obtain the required axial thickness E4.

Mechanical compacting is advantageously carried out using a hydraulic piston at a pressure of between 20 and 40 bars, preferably close to 30 bars. The manual compacting step is optional.

The steps 105 and 106 are repeated to produce a required number of wafers to produce a reactor, and these wafers are arranged in the envelope of the reactor (step 107).

Lastly, additional drying is carried out (step 108), by creating a vacuum in the envelope while heating this envelope. This additional drying removes the water present in the envelope or in the circuit of a cold production machine to which the envelope would be connected. This additional drying is also carried out to extract an excess of water which could have rehydrated the salt, to reduce the hydration rate to a value preferably close to zero moles of water per mole of manganese chloride, or to a lower value.

Obviously, the invention is not limited to the examples which have just been described. On the contrary, the invention is defined by the following claims.

It will appear to those skilled in the art that various modifications can be made to the embodiments described above, in the light of the information that has just been disclosed.

Thus, in particular, but not exclusively, the dimensions of the wafers may be different from those described previously. For example, the outer diameter of a wafer may advantageously be between forty millimetres and two hundred millimetres; it may also be greater than two hundred millimetres.

A matrix consisting of a "binder plus sorbent" composite in a consolidated form is relatively insensitive to the mechanical vibrations; it is therefore especially suitable for use to produce cold in a vehicle, in particular for goods transport by road.

The invention claimed is:

1. A reactive wafer consisting of a compact matrix for the sorption/desorption of a heat transfer fluid (FG), wherein the matrix comprises a mixture of sorbent and expanded natural graphite (ENG).

2. The wafer according to claim 1, wherein the wafer shape is cylindrical about an axis (X) and the wafer comprises a coaxial interior passage.

3. The wafer according to claim 2, wherein:
    the wafer has an outer diameter of between 40 mm and 200 mm;
    the passage has a diameter of between 17 mm and 23 mm; and,
    the wafer has a constant axial thickness of between 40 mm and 50 mm.

4. The wafer according to claim 1, wherein the matrix comprises a proportion of sorbent of between 76% and 82% of the mass of the mixture, with the expanded natural graphite forming the rest of the complement.

5. The wafer according to claim 1, wherein the sorbent is a manganese chloride salt.

6. The wafer according to claim 1, wherein the matrix is compacted such that an apparent mass of the ENG is between 100 $kg/m^3$ and 130 $kg/m^3$.

7. A method for manufacturing a wafer consisting of a compact matrix comprising a mixture of sorbent and expanded natural graphite (ENG), wherein the sorbent comprises manganese chloride hydrate, comprising drying to obtain a manganese chloride salt of water content less than 0.1 moles per mole of salt.

8. The method according to claim 7, further comprising mixing the manganese chloride monohydrate with the expanded natural graphite in chosen proportions and compacting said mixture.

9. The method according to claim 8, wherein the compacting comprises a manual compacting followed by a mechanical compacting.

10. A method for manufacturing a reactor, further comprising arranging one or more wafers manufactured according to claim 8, in an envelope of the reactor.

11. The method according to claim 10, further comprising drying by creating a vacuum in the envelope and by heating the envelope to a temperature close to 180° C., to extract water from the salt monohydrate.

* * * * *